(12) United States Patent
Takeuchi et al.

(10) Patent No.: US 6,491,398 B2
(45) Date of Patent: *Dec. 10, 2002

(54) VIDEO PROJECTOR

(75) Inventors: Katsuyuki Takeuchi, Tokyo (JP);
Eisaku Shouji, Tokyo (JP); Takayuki Matsumoto, Tokyo (JP)

(73) Assignee: NEC Viewtechnology, Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/472,820

(22) Filed: Dec. 28, 1999

(65) Prior Publication Data

US 2002/0012101 A1 Jan. 31, 2002

(30) Foreign Application Priority Data

Jan. 8, 1999 (JP) ............................................. 11-002957

(51) Int. Cl.⁷ .............................................. G03B 21/14
(52) U.S. Cl. ......................................... 353/31; 353/102
(58) Field of Search ............................. 353/31, 33, 34, 353/37, 102; 349/5, 8, 9, 7; 359/634, 831, 833; 348/742, 743, 771

(56) References Cited

U.S. PATENT DOCUMENTS

| 4,680,579 | A |   | 7/1987  | Ott                         |
|-----------|---|---|---------|-----------------------------|
| 4,913,528 | A | * | 4/1990  | Hasegawa ............... 353/33 |
| 5,560,697 | A | * | 10/1996 | Lim et al. ............... 353/37 |
| 5,648,860 | A | * | 7/1997  | Ooi et al. ............... 349/10 |
| 5,704,701 | A |   | 1/1998  | Kavanagh et al.             |
| 5,777,781 | A |   | 7/1998  | Nam et al.                  |
| 5,786,873 | A | * | 7/1998  | Chiu et al. ............... 353/37 |
| 5,865,520 | A | * | 2/1999  | Kavanagh et al. ......... 353/31 |
| 6,137,635 | A | * | 10/2000 | Nakazawa ................ 353/31 |
| 6,139,154 | A | * | 10/2000 | Haba ..................... 353/31 |
| 6,250,763 | B1 | * | 6/2001 | Fielding et al. ........... 353/31 |

FOREIGN PATENT DOCUMENTS

| EP | 0 509 194  | 10/1992 |
| JP | 8-68960    | 3/1996  |
| JP | 9-96867    | 4/1997  |
| JP | 9-222581   | 8/1997  |
| JP | 10-232430  | 9/1998  |

* cited by examiner

*Primary Examiner*—William Dowling
(74) *Attorney, Agent, or Firm*—Young & Thompson

(57) ABSTRACT

A video projector using a reflection type optical modulation element whose lens system is simple in configuration and which can produce a high-brightness, high-contract projected image. A video projector has an optical source for radiating light; a reflecting mirror for reflecting the light radiated by the optical source as a reflected light beam goes along a particular optical axis; a converting optical system for converting a profile of the reflected light beam from the reflecting mirror; a plurality of color prisms for wavelength-separating the convertedlight from the converting optical system into a plurality of colored light beams; a plurality of reflection type optical modulation elements for selectively reflecting each of the colored light beams from the color prisms on a pixel—pixel basis in accordance with each of received video signals, respectively; a projecting lens for projecting light obtained through wavelength-combining, by the color prisms, of light beams reflected by each of the reflection type optical modulation elements; and a plurality of condenser lenses disposed between the color prisms and the reflection type optical modulation elements, respectively.

8 Claims, 9 Drawing Sheets ved by the prism 226, and then

VIDEO PROJECTOR

BACKGROUND OF THE INVENTION

1. Field of the Invention

The present invention relates to a video projector. In particular, the invention relates to a video projector using a reflection type optical modulation element.

2. Description of the Prior Art

Video projectors for projecting an image in accordance with a received video signal are known.

Among those video projectors is one using a transmission type optical modulation element such as an LCD (Liquid Crystal Display) panel or the like and one using a reflection type optical modulation element such as a DMD (Digital Micromirror Device: a trademark of Texas Instruments, Incorporated) or the like.

Conventional video projectors using a reflection type optical modulation element will be described here with reference to the drawings.

FIG. 6 is a side view showing the structure of a video projector as a first conventional example. FIG. 7 is a sectional plan view taken along a line VI—VI in FIG. 6.

In the video projector shown in FIGS. 6 and 7, light emitted from an optical source 101 is reflected by a reflecting mirror 102 and thereby condensed onto a rod-shaped optical integrator 103. The light is reflected plural times in the rod-shaped optical integrator 103 and then output therefrom in a state that its illumination intensity distribution is uniformized.

The light exiting from the rod-shaped optical integrator 103 sequentially passes through relay lenses 104a–104c reflected by a reflecting mirror 105, passes through a relay lens 104d, and then reflected by the bonding surface of wedge-shaped prisms 106a and 106b that configure a reflecting prism 106.

The light reflected by the reflecting prism 106 is separated by color prisms 107R, 107G, and 107B into red light, green light, and blue light, respectively, which enter DMDs (Digital Micromirror Device: atrademark of Texas Instruments, Incorporated) 109R, 109G, and 109B, respectively.

The DMDs 109R, 109G, and 109B are supplied with video signals corresponding to red, green, and blue components, respectively. The reflectance values of the incident light beams are controlled on a pixel-by-pixel basis in accordance with those video signals.

Light beams reflected by the DMDs 109R, 109G, and 109B enter color prisms 107R, 107G, and 107B, respectively, whereby the red light, green light, and the blue light are combined into full-colored image light. The full-colored image light passes through the reflecting prism 106 straightly and is then enlarged by a projecting lens 110.

The light enlarged by the projecting lens 110 is projected onto a screen 111 as a projected image.

Japanese Patent Laid-Open No. Hei 9-96867 (Laid-Open in Japan on Apr. 8, 1997) discloses a video projector. The technique disclosed in this publication will be described below as a second conventional example.

FIG. 8 is a side view showing the structure of a video projector as a second conventional example. FIG. 9 is a plan view of the video projector of FIG. 8.

The video projector shown in FIGS. 8 and 9 has an optical radiating system 212, a tri-colored optical separating system 214, DMDs 216R, 216G, and 216B, and a projecting lens system 218.

The optical radiating system 212 is composed of an optical source 220, a condenser lens 222, a mirror 224, and a prism 226. White-colored light emitted from the optical source 220 is condensed by the condenser lens 222, reflected by the mirror 224, again reflected by the prism 226, and then enters the tri-colored optical separating system 214.

The white-colored light entering the tri-colored optical separating system 214 is separated by prisms 228R, 228G, and 228B into red light, green light, and blue light, respectively, which enter the DMDs 216R, 216G, and 216B that are disposed behind the respective prisms 228R, 228G, and 228B.

Light beams reflected by the respective DMDs 216R, 216G, and 216B are combined by the prisms 228R, 228G, and 228B and then projected onto a front screen (not shown) by lenses 234 and 236 of the projecting lens system 218.

However, the video projectors as the two conventional examples have the following problems.

In the first conventional example, first, since it is difficult to make the diameter of a light beam sufficiently small at the pupil position 110p of the projecting lens 110, it is impossible to cause all of light beams emitted from the optical source 101 to pass to the pupil position 110p of the projecting lens 110 without undue loss of light, resulting in a problem that a high-brightness, high-contrast projected image cannot be obtained.

Second, if to solve the first problem it is attempted to make the diameter of a light beam sufficiently small at the pupil position 110p of the projecting lens 110 by using the relay lenses 104a–104d, many relay lenses 104a–104d need to be combined in a complex manner, resulting in a problem that the transmittance of the relay lenses 104a–104d decreases and hence a high-brightness, high-contrast projected image cannot be obtained. Moreover, this complicated structure of the relay lenses 104a–104d increases their volumes; thus the video projector cannot be miniaturized.

The above problems also occur in the video projector as the second conventional example in completely the same manners.

SUMMARY OF THE INVENTION

An object of the present invention is therefore to provide a video projector using a reflection type optical modulation element whose lens system is simple in configuration and which can produce a high-brightness, high-contrast projected image.

According to a first aspect of the invention, there is provided a video projector having an optical source for radiatinglight; a reflecting mirror for reflecting the light radiated by the optical source as a reflected light beam goes along a particular optical axis; a converting optical system for converting a profile of the reflected light beam from the reflecting mirror; a plurality of color prisms for wavelength-separating the converted-light from the converting optical system into a plurality of colored light beams; a plurality of reflection type optical modulation elements for selectively reflecting each of the colored light beams from the color prisms on a pixel—pixel basis in accordance with each of received video signals, respectively; a projecting lens for projecting light obtained through wavelength-combining, by the color prisms, of light beams reflected by each of the reflection type optical modulation elements; and a plurality of condenser lenses disposed between the color prisms and the reflection type optical modulation elements, respectively.

According to a second aspect of the invention, in the video projector according to the first aspect, further having a relay lens disposed between the converting optical system and the color prisms.

In the video projector according to the first and second aspects of the invention, the condenser lenses corresponding to the respective colors are disposed immediately before the reflection type optical modulation elements corresponding to the respective colors. Therefore, the diameter of a light beam at the pupil position of the projecting lens can sufficiently be decreased, and hence all of a light beam emitted from the optical source can be used effectively without undue loss of light. Further, since the number of lenses configuring the lens system disposed between the optical source and the reflection type optical modulation elements can be reduced; the light transmittance can be kept high. As a result, the brightness and the contrast of a projected image on the screen can be increased.

Further, since the diameters of the condenser lenses can greatly be decreased, the video projector can be miniaturized.

According to a third aspect of the invention, in the video projector according to the second aspect, wherein the converting optical system has a rod-shaped optical integrator.

According to a fourth aspect of the invention, in the video projector according to the third aspect, wherein the reflecting mirror, the rod-shaped optical integrator, the relay lens, the condenser lenses, the reflection type optical modulation elements, and the projecting lens are disposed so as to satisfy: a relationship $(d1/d2)=(f1/f2)$ where $d1$ denotes a distance between an incident surface and an outgoing surface of the rod-shaped optical integrator, $d2$ denotes a distance between the relay lens and each of the reflection type optical modulation elements, $f1$ denotes a focal length of the reflecting mirror, and $f2$ denotes a focal length of the relay lens; and a relationship $(1/f3)=(1/d3)+(1/d4)$ where $d3$ denotes a distance between the incident surface of the rod-shaped optical integrator and each of the condenser lenses, $d4$ denotes a distance between each of the condenser lenses and a pupil position of the projecting lens, and $f3$ denotes a focal length of each of the condenser lenses.

In the video projectors according to the third and fourth aspects of the invention in which the rod-shaped optical integrator is used as the converting optical system, (1) an image on the outgoing surface of the rod-shaped optical integrator is converged on the reflection type optical modulation elements without undue loss of light, and (2) an image on the incident surface of the rod-shaped optical integrator is converted into a small cross-section at the pupil position of the projecting lens. Therefore, all of light beams emitted from the optical source can be used effectively without undue loss of light. Further, since the number of lenses configuring the lens system disposed between the optical source and the reflection type optical modulation elements can be reduced; the light transmittance can be kept high. As a result, the brightness and the contrast of a projected image on the screen can be increased.

Further, since the diameters of the condenser lenses can greatly be decreased, the video projector can be miniaturized.

According to a fifth aspect of the invention, in the video projector according to the second aspect, wherein the converting optical system has first and second fly-eyed lenses.

According to a sixth aspect of the invention, in the video projector according to the fifth aspect, wherein the first and second fly-eyed lens, the relay lens, the condenser lenses, the reflection type optical modulation elements, and the projecting lens are disposed so as to satisfy: a relationship $(d1/d2)=(f1/f2)$ where $d1$ denotes a distance between the first and second fly-eyed lenses, $d2$ denotes a distance between the relay lens and each of the reflection type optical modulation elements, $f1$ denotes a focal length of the first fly-eyed lens, and $f2$ denotes a focal length of the relay lens; and a relationship $(1/f3)=(1/d3)+(1/d4)$ where $d3$ denotes a distance between the second fly-eyed lens and each of the condenser lenses, $d4$ denotes a distance between each of the condenser lenses and a pupil position of the projecting lens, and $f3$ denotes a focal length of each of the condenser lenses.

In the video projectors according to the fifth and sixth aspects of the invention in which the first and second fly-eyed lenses are used as the converting optical system, (1) an image on the outgoing surface of the second fly-eyed lens is converged on the reflection type optical modulation elements without undue loss of light, and (2) an image on the incident surface of the first fly-eyed lens is converted into a small cross-section at the pupil position of the projecting lens. Therefore, all of a light beam emitted from the optical source can be used effectively without undue loss of light. Further, since the number of lenses configuring the lens system disposed between the optical source and the reflection type optical modulation elements can be reduced; the light transmittance can be kept high. As a result, the brightness and the contrast of a projected image on the screen can be increased.

Further, since the diameters of the condenser lenses can greatly be decreased, the video projector can be miniaturized.

BRIEF DESCRIPTION OF THE DRAWINGS

This above-mentioned and other objects, features and advantages of this invention will become more apparent by reference to the following detailed description of the invention taken in conjunction with the accompanying drawings.

DETAILED DESCRIPTION OF THE PREFERRED EMBODIMENTS (First Embodiment)

Figure 1:
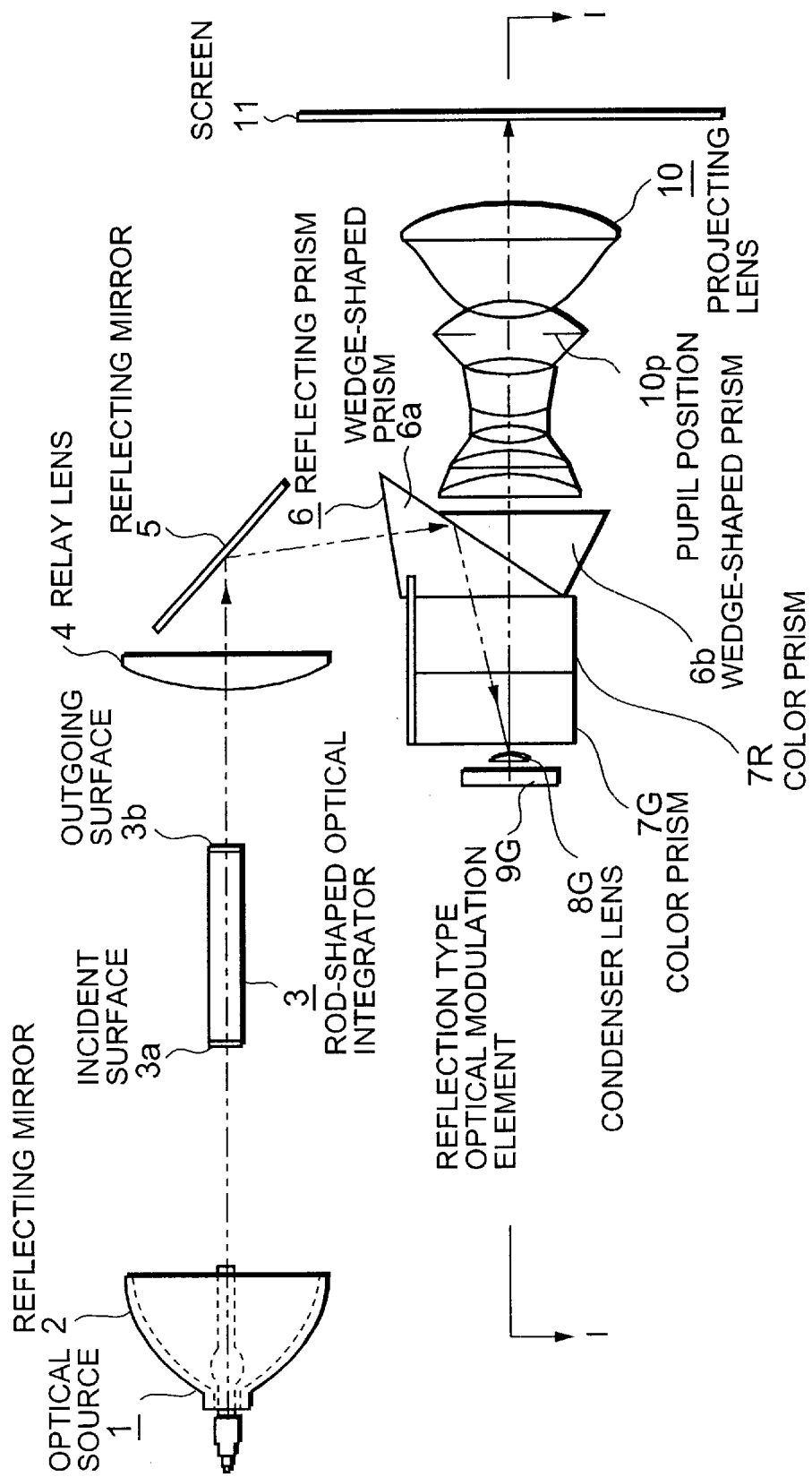
FIG. 1 is a side view showing the structure of a video projector according to a first embodiment of the present invention.
Figure 2:
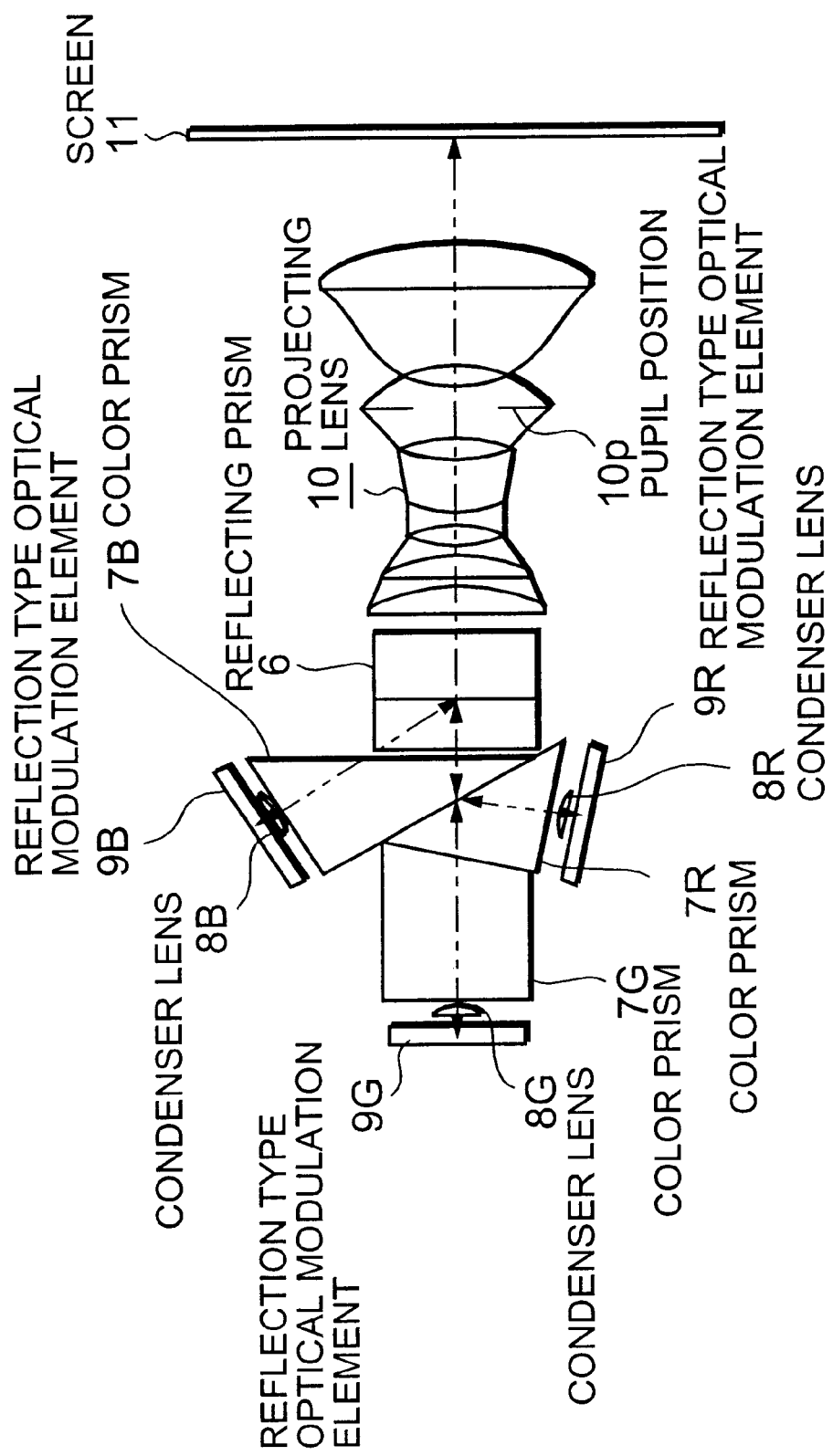
FIG. 2 is a sectional plan view taken along a line I—I in FIG. 1.
Figure 3:
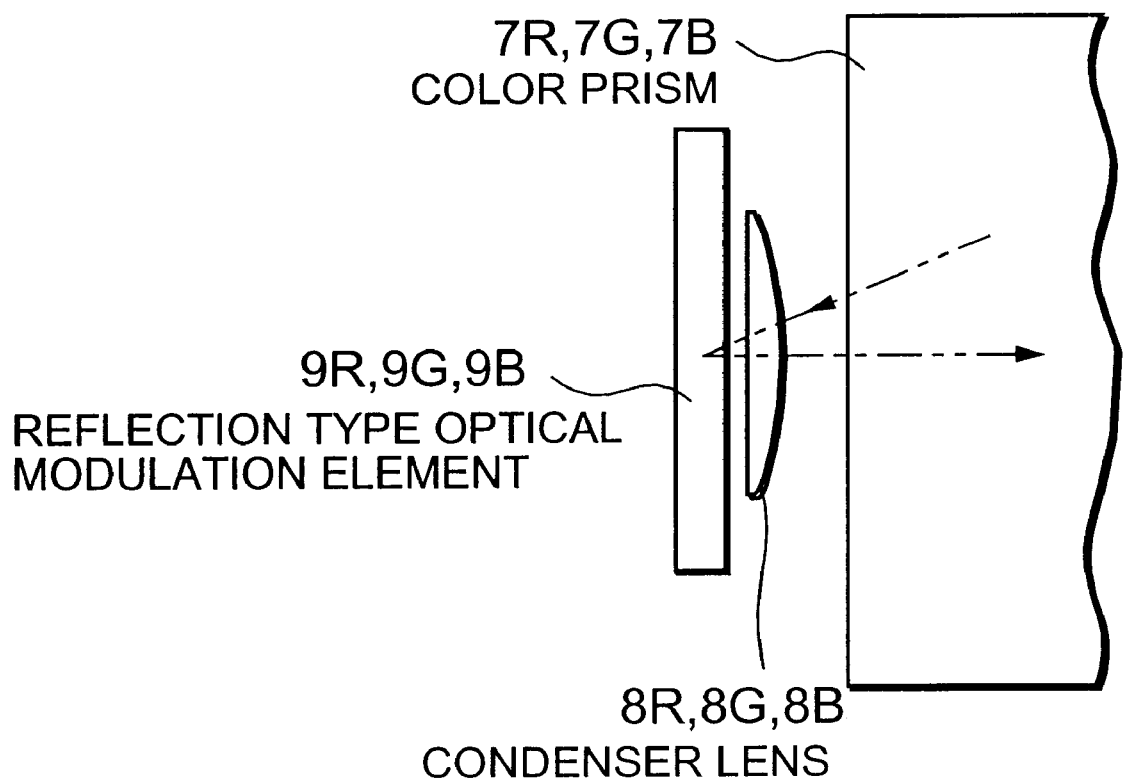
FIG. 3 is a partial enlarged side view showing a structure of a condenser lens and its vicinity of the video projector of FIG. 1.
Figure 4:
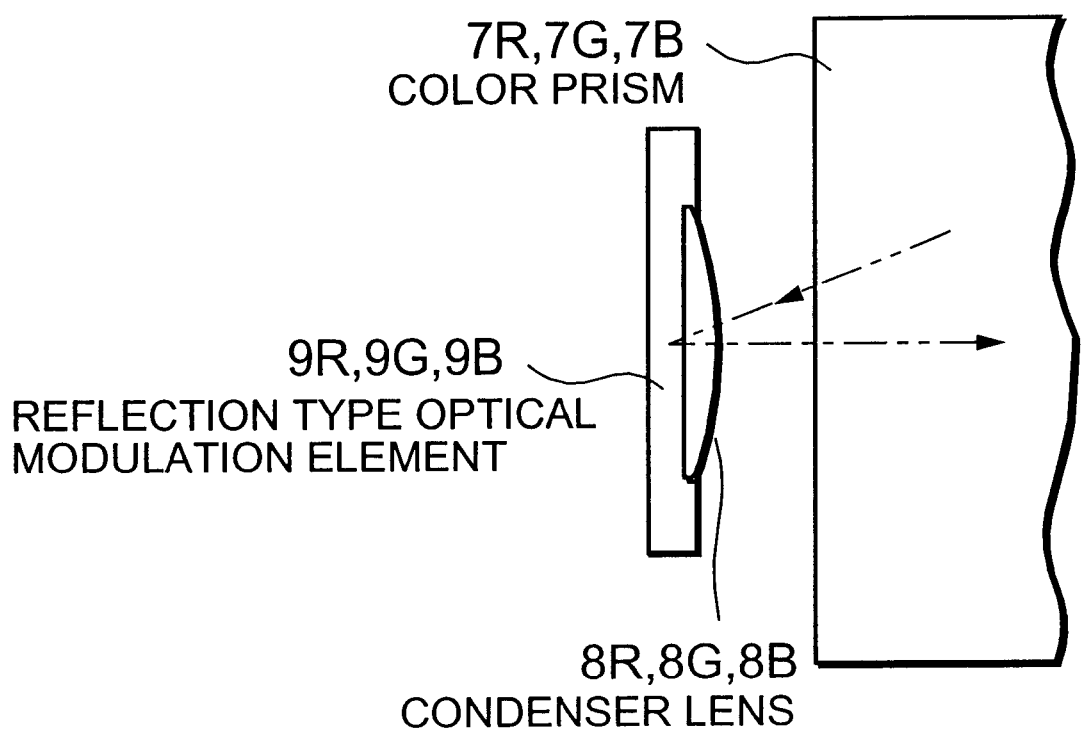
FIG. 4 is a partial enlarged side view showing another structure of a condenser lens and its vicinity of the video projector of FIG. 1.

FIG. 1 is a side view showing the structure of a video projector according to a first embodiment of the present invention. FIG. 2 is a sectional plan view taken along line I—I in FIG. 1. FIG. 3 is a partial enlarged side view showing a structure of a condenser lens and its vicinity of the video projector of FIG. 1. FIG. 4 is a partial enlarged side view showing another structure of a condenser lens and its vicinity of the video projector of FIG. 1.

The video projector according to the first embodiment shown in FIGS. 1–4 includes an optical source 1, a reflecting mirror 2, a rod-shaped optical integrator 3, a relay lens 4, a reflecting mirror 5, a reflecting prism 6, color prisms 7R, 7G, and 7B, condenser lenses 8R, 8G, and 8B, reflection type optical modulation elements 9R, 9G, and 9B, and a projecting lens 10.

The optical source 1 is a white-colored optical source such as a high-pressure mercury lamp. Alternatively, it may be an arbitrary white-colored optical source such as a metal halide lamp, a xenon lamp, or a halogen lamp.

The reflecting mirror 2, which is an elliptical surface mirror, converts light that is radiated from the optical source 1 to all directions into parallel light going along a particular optical axis and outputs the parallel light.

The rod-shaped optical integrator 3 is an optical element formed by, for example, evaporating a dielectric multilayered film onto an incident surface 3a and an outgoing surface 3b that are both end surfaces of a rod-shaped glass member. The light coming from the reflecting mirror 2 incident onto the incident surface 3a is reflected plural times by the semi-transparent films and then is output from the outgoing surface 3b, whereby the illumination intensity distribution of the light beam is uniformized over its entire cross-section.

The relay lens 4 is an optical condensing element that condenses light exiting from the rod-shaped optical integrator 3 without dispersing it and inputs resulting condensed light to the reflection type optical modulation elements 9R, 9G, and 9B with high efficiency of light utilization.

The reflecting mirror 5 is an optical element that reflects light that has passed through the relay lens 4 toward the reflecting prism 6. The reflecting mirror 5 is inclined with respect to the optical axis of incident light so as to irradiate light to the reflecting prism 6 perpendicularly to its incident surface.

The reflecting prism 6 is an optical element for irradiating light to the reflection type optical modulation elements 9 at predetermined angles. As shown in FIG. 1, in the reflecting prism 6, the bonding surface of wedge-shaped prisms 6a and 6b is disposed at such an angle as to reflect, toward the color prisms 7R, 7G, and 7B, light that is reflected by the reflecting mirror 5. As for the bonding surface of the wedge-shaped prisms 6a and 6b, an air gap (not shown) is provided between the wedge-shaped prisms 6a and 6b so as to totally reflect incident light toward the color prisms 7R, 7G, and 7B. It is preferable that the width of the air gap is about 10 $\mu$m.

The color prisms 7R, 7G, and 7B are optical elements that separate white-colored light coming from the reflecting prism 6 into red-colored light, green-colored light, and blue-colored light. The separated light beams of the three primary colors are incident onto the respective reflection type optical modulation elements 9R, 9G, and 9B. As shown in FIG. 2, the color prisms 7R, 7G, and 7B are formed by bonding together wedge-shaped prisms 7R, 7G, and 7B. The bonding surfaces of the wedge-shaped prisms 7R, 7G, and 7B are formed with coating layers (not shown) that selectively reflect or transmit only a component of a red, green, or blue wavelength range.

The condenser lenses 8R, 8G, and 8B, which are disposed immediately before the respective reflection type optical modulation elements 9R, 9G, and 9B parallel with those, condense light beams exiting from the respective color prisms 7R, 7G, and 7B without dispersing those and irradiate as light beams to the respective reflection type optical modulation elements 9R, 9G, and 9B.

Each of the reflection type optical modulation elements 9R, 9G, and 9B is any of various kinds of reflection type optical modulation elements such as a DMD (Digital Micromirror Device: a trademark of Texas Instruments, Incorporated). In case of the DMD, each of the reflection type optical modulation elements 9R, 9G, and 9B is configured in such a manner that a number of minute mirrors that are supported by flexible poles are arranged in matrix form. Video signals corresponding to the respective pixels are supplied to control electrodes that are disposed in the vicinity of the respective mirrors, whereby the reflecting surfaces of the respective mirrors are selectively deflected by electromagnetic force in accordance with whether a video signal corresponding to each pixel is supplied or not. In this manner, only selected mirrors reflect light beams toward the projecting lens 10.

The projecting lens 10 is an optical element that enlarges and projects, as a projected image, onto a screen 11, light reflected by the reflection type optical modulation elements 9R, 9G, and 9B, combining in re-passage through the condenser lenses 8R, 8G, and 8B and the color prisms 7R, 7G, and 7B, and passage through the reflecting prism 6. A known focus adjusting mechanism (not shown) for focusing adjustment of the projected image or a known zooming mechanism (not shown) for adjusting the area of the projected image may be added to the projecting lens 10.

The important feature of this embodiment is that instead of using relay lenses having a complex structure, the condenser lenses 8R, 8G, and 8B are disposed between the color prisms 7R, 7G, and 7B and the reflection type optical modulation elements 9R, 9G, and 9B, respectively, whereby light beams outgoing from the color prisms 7R, 7G, and 7B are incident onto the reflection type optical modulation elements 9R, 9G, and 9B, respectively, with high efficiency of light utilization.

Next, the principle of operation of the video projector according to this embodiment will be described.

Light exiting from the optical source 1 is reflected by the reflecting mirror 2 and condensed onto the incident surface 3a of the rod-shaped optical integrator 3.

The light incident onto the incident surface 3a is reflected plural times in the rod-shaped optical integrator 3, and then output from the outgoing surface 3b of the rod-shaped optical integrator 3 in a state that its illumination intensity distribution is uniformized.

The light exiting from the outgoing surface 3b of the rod-shaped optical integrator 3 is condensed by the relay lens 4, is reflected by the reflecting mirror 5, and then is irradiated on the incident surface of the reflecting prism 6 vertically.

The light incident on the reflecting prism 6 is totally reflected by it and enters the color prisms 7R, 7G, and 7B, where the light is separated into light beams of the three primary colors, that is, red-colored light, green-colored light, and blue-colored light, which enter the respective condenser lenses 8R, 8G, and 8B.

As shown in FIG. 3, the condenser lenses 8R, 8G, and 8B are supported as independent parts between the color prisms 7R, 7G, and 7B and the reflection type optical modulation elements 9R, 9G, and 9B, respectively. Alternatively, as shown in FIG. 4, the condenser lenses 8R, 8G, and 8B may be made integral with the respective reflection type optical modulation elements 9R, 9G, and 9B by bonding the condenser lenses 8R, 8G, and 8B to the surfaces of the respective reflection type optical modulation elements 9R, 9G, and 9B, burying the condenser lenses 8R, 8G, and 8B in the respective reflection type optical modulation elements 9R, 9G, and 9B, or sealing the condenser lenses 8R, 8G, and 8B with resin or the like.

The condenser lenses 8R, 8G, and 8B are so designed that (1) an image on the outgoing surface 3b of the rod-shaped optical integrator 3 is condensed onto the reflection type optical modulation elements 9R, 9G, and 9B without undue loss of light, and that (2) an image on the incident surface 3a of the rod-shaped optical integrator 3 is converted into a small-diameter cross-section at the pupil position 10p of the projecting lens 10.

More specifically, as for item (1), the reflecting mirror 2, the rod-shaped optical integrator 3, the relay lens 4, and the reflection type optical modulation elements 9R, 9G, and 9B are arranged so as to satisfy a relationship (d1/d2)=(f1/f2) where d1 denotes the distance between the incident surface 3a and the outgoing surface 3b of the rod-shaped optical integrator 3, d2 denotes the distance between the relay lens 4 and each of the reflection type optical modulation elements 9R, 9G, and 9B, f1 denotes the focal length of the reflecting mirror 2, and f2 denotes the focal length of the relay lens 4.

As for item (2), the rod-shaped optical integrator 3, the condenser lenses 8R, 8G, and 8B, and the projecting lens 10 are arranged so as to satisfy a relationship (1/f3)=(1/d3)+(1/d4) where d3 denotes the distance between the incident surface 3a of the rod-shaped optical integrator 3 and each of the condenser lenses 8R, 8G, and 8B, d4 denotes the distance between each of the condenser lenses 8R, 8G, and 8B and the pupil position 10p of the projecting lens 10, and f3 denotes the focal length of each of the condenser lenses 8R, 8G, and 8B.

Light beams condensed by the condenser lenses 8R, 8G, and 8B are irradiated on the reflection type optical modulation elements 9R, 9G, and 9B, respectively.

Supplied with video signals corresponding to red, green, and blue components, the reflection type optical modulation elements 9R, 9G, and 9B reflect only incident light beams for video-signal-supplied pixels toward the projecting lens 10.

The light beams reflected by the reflection type optical modulation elements 9R, 9G, and 9B again pass through the respective condenser lenses 8R, 8G, and 8B and are combined together by the color prisms 7R, 7G, and 7B. Resulting combined light carrying a full-colored image passes through the reflecting prism 6.

The light passed through the reflecting prism 6 is enlarged by the projecting lens 10 and projected onto the screen 11.

As described, in this embodiment, the condenser lenses 8R, 8G, and 8B are disposed between the color prisms 7R, 7G, and 7B and the reflection type optical modulation elements 9R, 9G, and 9B, respectively.

The condenser lenses 8R, 8G, and 8B are so designed that (1) an image on the outgoing surface 3b of the rod-shaped optical integrator 3 is condensed onto the reflection type optical modulation elements 9R, 9G, and 9B without undue loss of light, and that (2) an image on the incident surface 3a of the rod-shaped optical integrator 3 is converted into a small-diameter cross-section at the pupil position 10p of the projecting lens 10. Therefore, all of light beams emitted from the optical source 1 can be incident onto the reflection type optical modulation elements 9R, 9G, and 9B with high efficiency of light utilization without undue loss of light, and hence the brightness of a projected image on the screen 11 can be increased.

Further, since the diameters of incident light beams are made sufficiently small immediately before the reflection type optical modulation elements 9R, 9G, and 9B by the relay lens 4, the diameters of the respective condenser lenses 8R, 8G, and 8B can be made small. As a result, the lens system and hence the video projector can be miniaturized.

(Second Embodiment)

Figure 5:
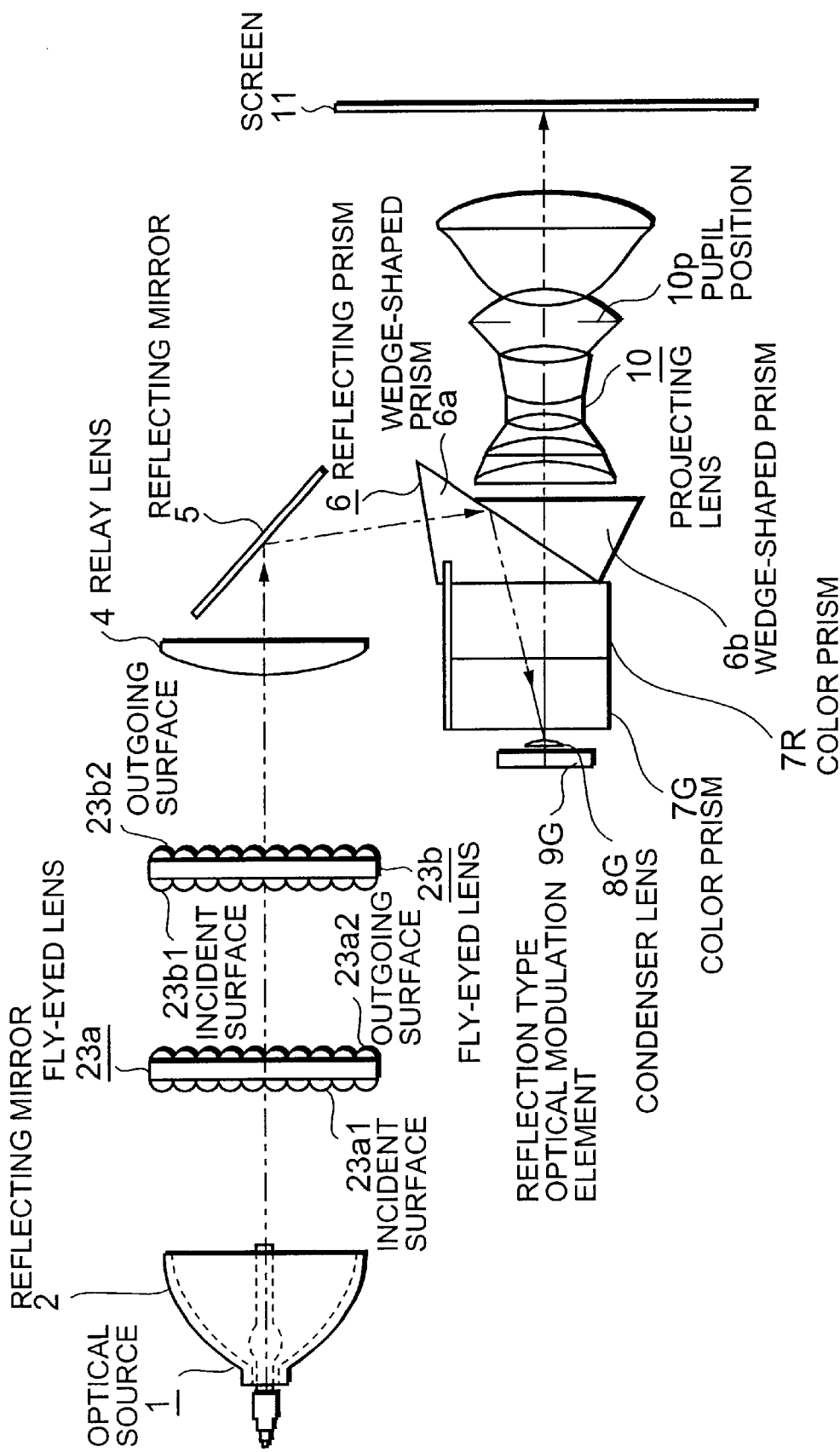
FIG. 5 is a side view showing the structure of a video projector according to a second embodiment of the invention.
Figure 6:
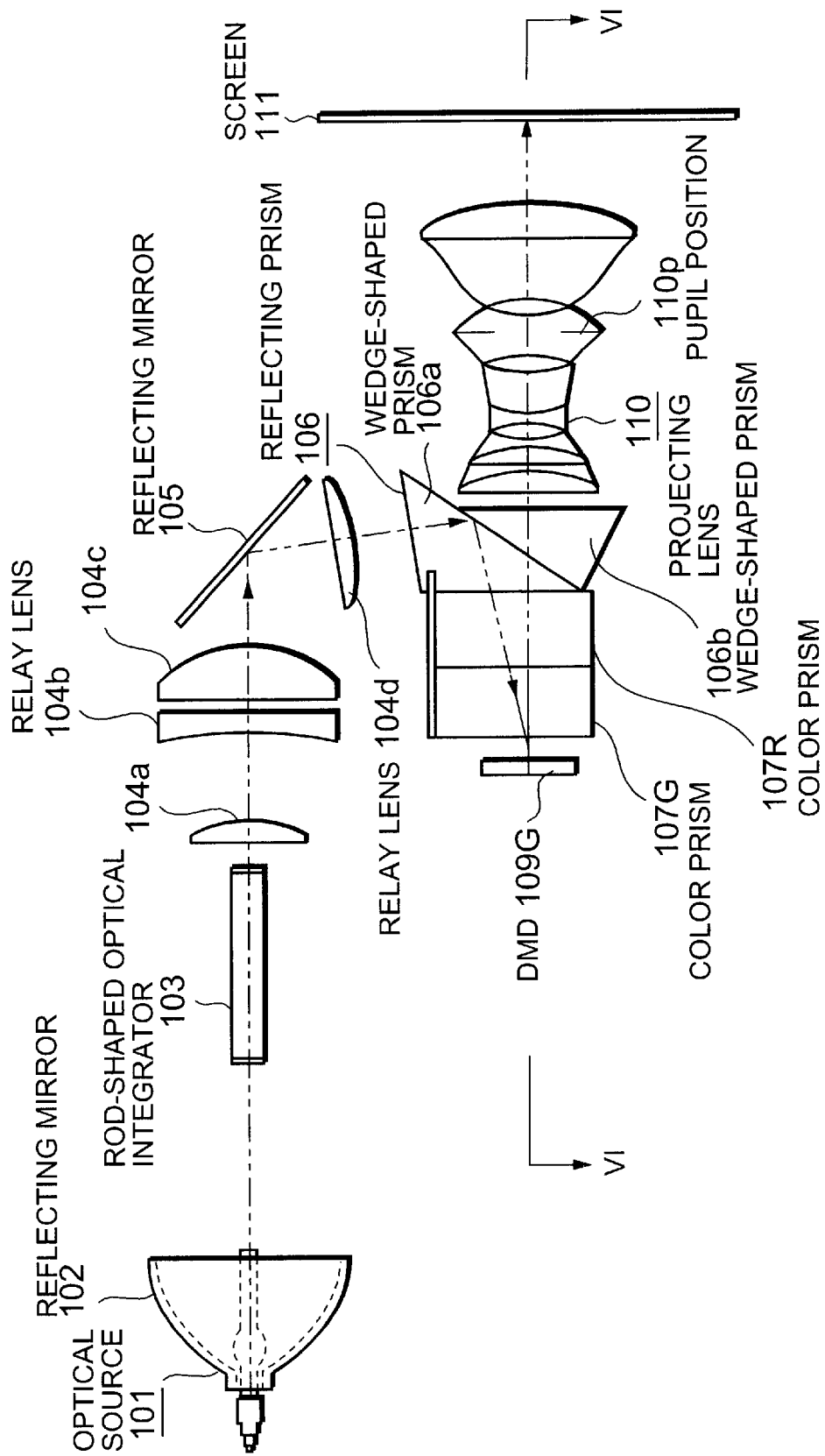
FIG. 6 is a side view showing the structure of a video projector as a first conventional example.
Figure 7:
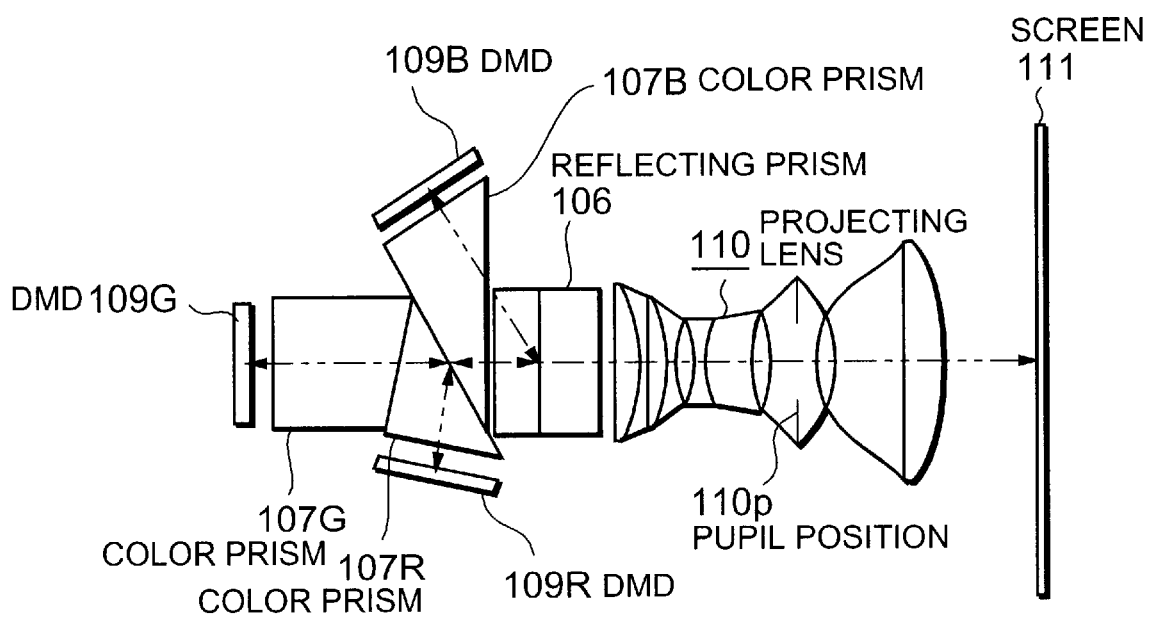
FIG. 7 is a sectional plan view taken along a line VI—VI in FIG. 6.
Figure 8:
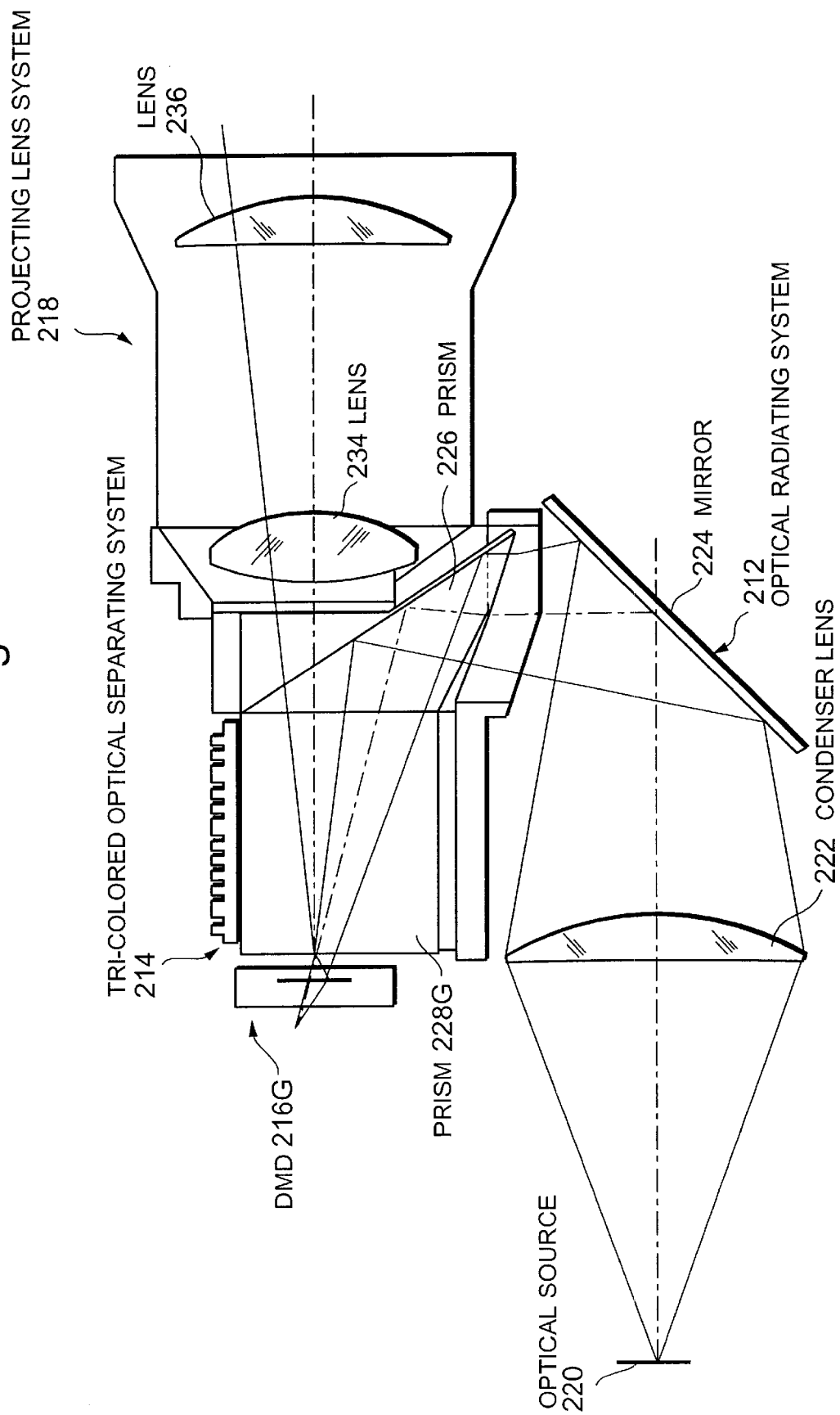
FIG. 8 is a side view showing the structure of a video projector as a second conventional example.
Figure 9:
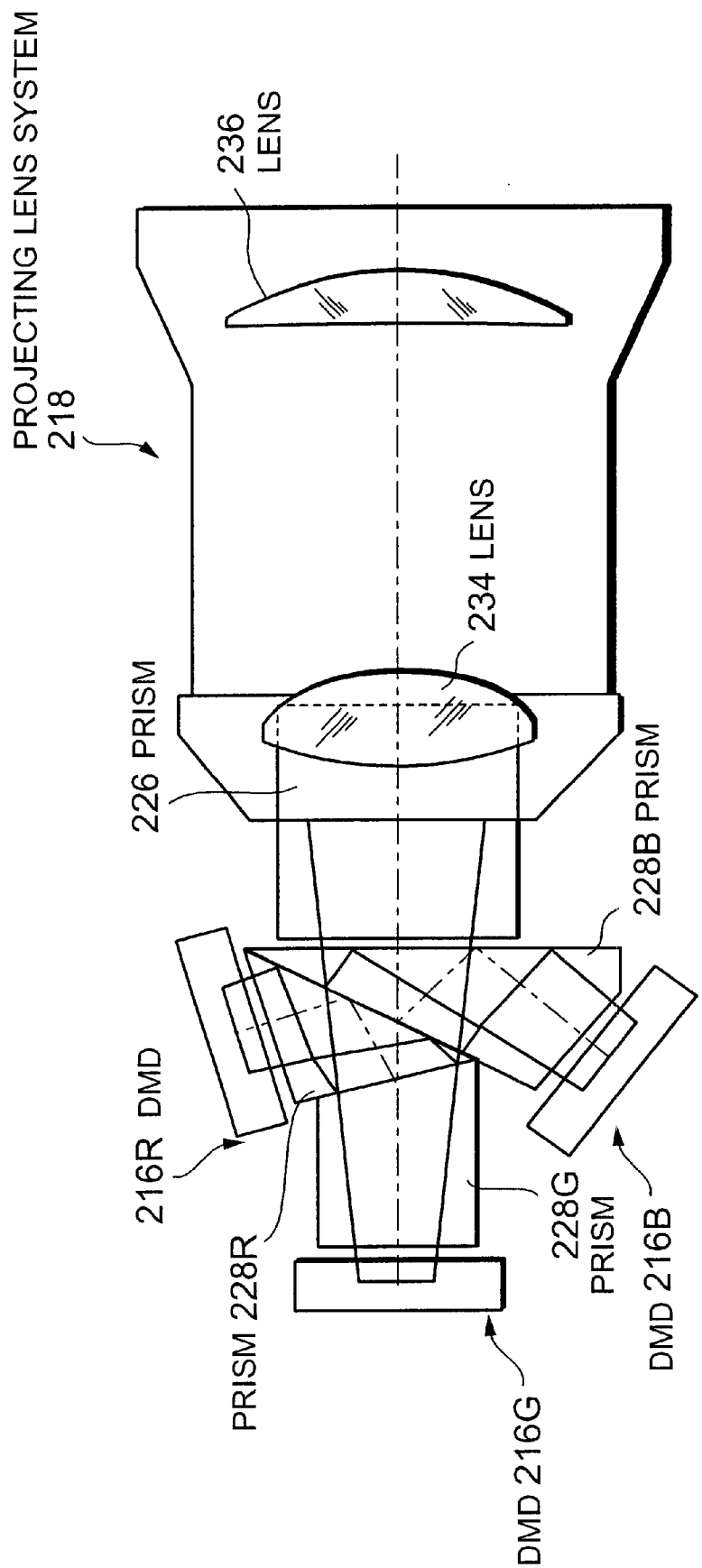
FIG. 9 is a plan view of the video projector of FIG. 8.

FIG. 5 is a side view showing the structure of a video projector according to a second embodiment of the present invention. This embodiment is configured in such a manner that the rod-shaped optical integrator 3 of the first embodiment is replaced by two fly-eyed lenses 23a and 23b. Since the other configurations of this embodiment is the same as the corresponding configuration of the first embodiment, FIG. 2 will also be referred to in the following description.

Each of the fly-eyed lens 23a and 23b, which is a lens (optical element) in which a number of minute lenses are arranged in matrix form on a plane, converts light beams incident on an incident surface 23a1 or 23b1 into light beams that are equivalent to light beams emitted from a number of minute optical sources, and outputs the resulting light beams from an outgoing surface 23a2 or 23b2.

The important feature of this embodiment is that instead of using relay lenses having a complex configuration, the condenser lenses 8R, 8G, and 8B are disposed between the color prisms 7R, 7G, and 7B and the reflection type optical modulation elements 9R, 9G, and 9B, respectively, whereby light beams exiting from the color prisms 7R, 7G, and 7B are incident onto the reflection type optical modulation elements 9R, 9G, and 9B, respectively, with high efficiency of light utilization.

Next, the principle of operation of the video projector according to this embodiment will be described.

Light emitted from the optical source 1 is reflected by the reflecting mirror 2 and thereby converted into parallel light, which is irradiated on the incident surface 23a1 of the fly-eyed lens 23a.

The light beam entering the fly-eyed lens 23a through the incident surface 23a1 is output from the outgoing surface 23a2 in a state that its illumination intensity distribution is uniformized over its entire cross-section. The light outgoing from the outgoing surface 23a2 enters the fly-eyed lens 23b through the incident surface 23b1 is output from the outgoing surface 23b2 in a state that its illumination intensity distribution is further uniformized.

The light outgoing from the outgoing surface 23b2 of the fly-eyed lens 23b is condensed by the relay lens 4, is reflected by the reflecting mirror 5, and then is irradiated on the reflecting prism 6 vertically.

The incident light on the reflecting prism 6 is totally reflected by the bonding surface of the wedge-shaped prisms 6a and 6b and enters the color prisms 7R, 7G, and 7B, where the light is separated into light beams of the three primary colors, that is, red-colored light, green-colored light, and blue-colored light. An image on the outgoing surface 23b2 of the fly-eyed lens 23b is converged on the reflection type optical modulation elements 9R, 9G, and 9B by the respective condenser lenses 8R, 8G, and 8B.

As described above, in this embodiment, the condenser lenses 8R, 8G, and 8B are disposed between the color prisms 7R, 7G, and 7B and the reflection type optical modulation elements 9R, 9G, and 9B, respectively.

The condenser lenses 8R, 8G, and 8B are so designed that (1) an image on the outgoing surface 23b2 of the fly-eyed lens 23b is condensed onto the reflection type optical modulation elements 9R, 9G, and 9B without undue loss of light, and that (2) an image on the incident surface 23a1 of the fly-eyed lens 23a is converted into a small-diameter cross-section at the pupil position 1op of the projecting lens 10.

More specifically, as for item (1), the fly-eyed lenses 23a and 23b, the relay lens 4, and the reflection type optical modulation elements 9R, 9G, and 9B are arranged so as to satisfy a relationship (d1/d2)=(f1/f2) where d1 denotes the distance between the fly-eyed lenses 23a and 23b, d2 denotes the distance between the relay lens 4 and each of the reflection type optical modulation elements 9R, 9G, and 9B, f1 denotes the focal length of the fly-eyed lens 23a, and f2 denotes the focal length of the relay lens 4.

As for item (2), the fly-eyed lens 23b, the condenser lenses 8R 8G, and 8B, and the projecting lens 10 are arranged so as to satisfy a relationship (1/f3)=(1/d3)+(1/d4) where d3 denotes the distance between the fly-eyed lens 23b and each of the condenser lenses 8R, 8G, and 8B, d4 denotes the distance between each of the condenser lenses 8R, 8G, and 8B and the pupil position 10p of the projecting lens 10, and f3 denotes the focal length of each of the condenser lenses 8R, 8G, and 8B.

Light beams incident on the reflection type optical modulation elements 9R, 9G, and 9B are selectively reflected toward the projecting lens 10 on a pixel-by-pixel basis in accordance with received video signals. The reflected light beams again pass through the respective condenser lenses 8R, 8G, and 8B and then enter the respective color prisms 7R, 7G, and 7B.

The light beams entering the respective color prisms 7R, 7G, and 7B are combined together by the color prisms 7R, 7G, and 7B. Resulting combined light carrying a full-colored image passes through the reflecting prism 6, is enlarged by the projecting lens 10, and is projected on the screen 11.

As described above, in this embodiment, as in case of the first embodiment, the condenser lenses 8R, 8G, and 8B are disposed between the color prisms 7R, 7G, and 7B and the reflection type optical modulation elements 9R, 9G, and 9B, respectively. The condenser lenses 8R, 8G, and 8B are so designed that (1) an image on the outgoing surface 23b2 of the fly-eyed lens 23b is condensed onto the reflection type optical modulation elements 9R, 9G, and 9B without undue loss of light, and that (2) an image on the incident surface 23a1 of the fly-eyed lens 23a is converted into a small-diameter cross-section at the pupil position 10p of the projecting lens 10. Therefore, all of light beams emitted from the optical source 1 can be incident onto the reflection type optical modulation elements 9R, 9G, and 9B with high efficiency of light utilization without undue loss of light, and hence the brightness of a projected image on the screen 11 can be increased.

Further, since the diameters of light beams are made sufficiently small immediately before the reflection type optical modulation elements 9R, 9G, and 9B by the relay lens 4, the diameters of the respective condenser lenses 8R, 8G, and 8B can be made small. As a result, the lens system and hence the video projector can be miniaturized.

In the second embodiment, as in case of the first embodiment, the condenser lenses 8R, 8G, and 8B may be provided in the manner of either FIG. 3 or FIG. 4.

Although the rod-shaped optical integrator 3 is used in the first embodiment and the fly-eyed lenses 23a and 23b are used in the second embodiment, an embodiment in which both of the rod-shaped optical integrator 3 and the fly-eyed lenses 23a and 23b are used and an embodiment in which neither of them are used are within the technical scope of the invention.

Although one rod-shaped optical integrator 3 is used in the first embodiment and two fly-eyed lenses 23a and 23b are used in the second embodiment, the number of rod-shaped optical integrators or fly-eyed lenses may be determined arbitrarily.

As described above, according to the video projector of the invention, the brightness and the contrast of a projected image on the screen can be increased. This is because by virtue of the structure that the condenser lenses are disposed immediately before the respective reflection type optical modulation elements, light beams can be incident onto the reflection type optical modulation elements with high efficiency of light utilization without undue loss of light.

Further, the size of the video projector can be reduced. This is because the diameters of incident light beams are sufficiently decreased immediately before the reflection type optical modulation elements by the relay lens and hence the diameters of the condenser lenses can be decreased. further, since the structure of relay lenses is simplified, the number of relay lenses can be reduced.

What is claimed is:

1. A video projector comprising:

an optical source for radiating light;

a reflecting mirror for reflecting said light radiated by said optical source as a reflected light beam goes along a particular optical axis;

a converting optical system for converting a profile of said reflected light beam from said reflecting mirror;

a plurality of color prisms for wavelength-separating said converted-light from said converting optical system into a plurality of colored light beams;

a plurality of digital micromirror devices for selectively reflecting each of said colored light beams from said color prisms on a pixel—pixel basis in accordance with each of received video signals, respectively;

a projecting lens for projecting light obtained through wavelength-combining, by said color prisms, of light beams reflected by each of said digital micro-mirror devices; and a plurality of condenser lenses disposed between said color prisms and said digital micro-mirror devices, respectively, wherein each diameter of said converted light from said optical system is reduced immediately before said plurality of digital micro-mirror devices by said optical system so that each diameter of said plurality of condenser lenses is reduced and a diameter of a light beam at a pupil position of said projecting lens is decreased.

2. The video projector as defined in claim 1, further comprising a relay lens disposed between said converting optical system and said color prisms.

3. The video projector as defined in claim 2, wherein said converting optical system comprises a rod-shaped optical integrator.

4. The video projector as defined in claim 3, wherein said reflecting mirror, said rod-shaped optical integrator, said relay lens, said condenser lenses, said reflection type optical modulation elements, and said projecting lens are disposed so as to satisfy:

a relationship (d1/d2)=(f1/f2) where d1 denotes a distance between an incident surface and an outgoing surface of said rod-shaped optical integrator, d2 denotes a distance between said relay lens and each of said reflection type optical modulation elements, f1 denotes a focal length of said reflecting mirror, and f2 denotes a focal length of said relay lens; and a relationship (1/f3)=(1/d3)+(1/d4) where d3 denotes a distance between said incident surface of said rod-shaped optical integrator and each of said condenser lenses, d4 denotes a distance between each of said condenser lenses and a pupil position of said projecting lens, and f3 denotes a focal length of each of said condenser lenses.

5. The video projector as defined in claim 2, wherein said converting optical system comprises first and second fly-eyed lenses.

6. The video projector as defined in claim 5, wherein said first and second fly-eyed lens, said relay lens, said condenser lenses, said reflection type optical modulation elements, and said projecting lens are disposed so as to satisfy:

a relationship $(d1/d2)=(f1/f2)$ where d1 denotes a distance between said first and second fly-eyed lenses, d2 denotes a distance between said relay lens and each of said reflection type optical modulation elements, f1 denotes a focal length of said first fly-eyed lens, and f2 denotes a focal length of said relay lens; and a relationship $(1/f3)=(1/d3)+(1/d4)$ where d3 denotes a distance between said second fly-eyed lens and each of said condenser lenses, d4 denotes a distance between each of said condenser lenses and a pupil position of said projecting lens, and f3 denotes a focal length of each of said condenser lenses.

7. A video projector comprising:

an optical source for radiating light;

a reflecting mirror for reflecting said light radiated by said optical source as a reflected light beam goes along a particular optical axis;

a converting optical system for converting a profile of said reflected light beam from said reflecting mirror;

a plurality of color prisms for wavelength-separating said converted-light from said converting optical system into a plurality of colored light beams;

a plurality of reflection type optical modulation elements for selectively reflecting each of said colored light beams from said color prisms on a pixel—pixel basis in accordance with each of received video signals, respectively;

a projecting lens for projecting light obtained through wavelength-combining, by said color prisms, of light beams reflected by each of said reflection type optical modulation elements;

a plurality of condenser lenses disposed between said color prisms and said reflection type optical modulation elements, respectively; and a relay lens disposed between said converting optical system and said color prisms, said converting optical system comprising a rod-shaped optical integrator, wherein said reflecting mirror, said rod-shaped optical integrator, said relay lens, said condenser lenses, said reflection type optical modulation elements, and said projecting lens are disposed so as to satisfy:

a relationship $(d1/d2)=(f1/f2)$ where d1 denotes a distance between an incident surface and an outgoing surface of said rod-shaped optical integrator, d2 denotes a distance between said relay lens and each of said reflection type optical modulation elements, f1 denotes a focal length of said reflecting mirror, and f2 denotes a focal length of said relay lens; and a relationship $(1/f3)=(1/d3)+(1/d4)$ where d3 denotes a distance between said incident surface of said rod-shaped optical integrator and each of said condenser lenses, d4 denotes a distance between each of said condenser lenses and a pupil position of said projecting lens, and f3 denotes a focal length of each of said condenser lenses.

8. A video projector comprising:

an optical source for radiating light;

a reflecting mirror for reflecting said light radiated by said optical source as a reflected light beam goes along a particular optical axis;

a converting optical system for converting a profile of said reflected light beam from said reflecting mirror;

a plurality of color prisms for wavelength-separating said converted-light from said converting optical system into a plurality of colored light beams;

a plurality of reflection type optical modulation elements for selectively reflecting each of said colored light beams from said color prisms on a pixel—pixel basis in accordance with each of received video signals, respectively;

a projecting lens for projecting light obtained through wavelength-combining, by said color prisms, of light beams reflected by each of said reflection type optical modulation elements;

a plurality of condenser lenses disposed between said color prisms and said reflection type optical modulation elements, respectively;

a relay lens disposed between said converting optical system and said color prisms, said converting optical system comprising first and second fly-eyed lenses, wherein said first and second fly-eyed lens, said relay lens, said condenser lenses, said reflection type optical modulation elements, and said projecting lens are disposed so as to satisfy:

a relationship $(d1/d2)=(f1/f2)$ where d1 denotes a distance between said first and second fly-eyed lenses, d2 denotes a distance between said relay lens and each of said reflection type optical modulation elements, f1 denotes a focal length of said first fly-eyed lens, and f2 denotes a focal length of said relay lens; and a relationship $(1/f3)=(1/d3)+(1/d4)$ where d3 denotes a distance between said second fly-eyed lens and each of said condenser lenses, d4 denotes a distance between each of said condenser lenses and a pupil position of said projecting lens, and f3 denotes a focal length of each of said condenser lenses.

* * * * *